US012203317B2

(12) United States Patent
Dörnen et al.

(10) Patent No.: US 12,203,317 B2
(45) Date of Patent: Jan. 21, 2025

(54) BRAKING DEVICE FOR A DRIVE DEVICE

(71) Applicant: Edscha Engineering GmbH, Remscheid (DE)

(72) Inventors: Jörg Dörnen, Remscheid (DE); Christian Bartschies, Remscheid (DE); Jochen Bals, Remscheid (DE); Peter Mrowka, Remscheid (DE)

(73) Assignee: Edscha Engineering GmbH, Remscheid (DE)

( * ) Notice: Subject to any disclaimer, the term of this patent is extended or adjusted under 35 U.S.C. 154(b) by 84 days.

(21) Appl. No.: 17/918,762

(22) PCT Filed: Apr. 9, 2021

(86) PCT No.: PCT/DE2021/100326

§ 371 (c)(1),
(2) Date: Oct. 13, 2022

(87) PCT Pub. No.: WO2021/209089

PCT Pub. Date: Oct. 21, 2021

(65) Prior Publication Data

US 2023/0126471 A1 Apr. 27, 2023

(30) Foreign Application Priority Data

Apr. 14, 2020 (DE) ..................... 10 2020 110 214.3

(51) Int. Cl.
*E05F 3/16* (2006.01)

(52) U.S. Cl.
CPC ............ *E05F 3/16* (2013.01); *E05Y 2201/10* (2013.01); *E05Y 2201/21* (2013.01);
(Continued)

(58) Field of Classification Search
CPC .... E05F 3/16; E05Y 2201/10; E05Y 2201/21; E05Y 2600/54; E05Y 2800/268;
(Continued)

(56) References Cited

U.S. PATENT DOCUMENTS 3,028,619 A * 4/1962 Schlage .................. E05F 3/221 16/49
6,684,455 B1 * 2/2004 Mertin .................. E05D 11/087 16/337
(Continued)

FOREIGN PATENT DOCUMENTS

CN 112065207 A 12/2020
DE 102015009717 A1 2/2017
(Continued)

*Primary Examiner* — Christine M Mills
*Assistant Examiner* — Matthew J Sullivan
(74) *Attorney, Agent, or Firm* — Davidson Kappel LLC

(57) ABSTRACT

A brake arrangement for a drive apparatus, in particular for a drive apparatus for adjusting a vehicle flap, includes a brake housing (2), wherein the brake housing (2) comprises a first brake housing part (3) and a second brake housing part (7), a first brake element (13) which is arranged non-rotatably in the brake housing (2), a second brake element (15) which is arranged rotatably in the brake housing (2), and a preload means (19) for preloading one of the first brake element (13) and second brake element (15) toward the other of the first brake element (13) and second brake element (15) in the direction of a longitudinal axis (L) of the brake housing (2). The brake housing (2) has a connecting section (11) for connecting the first brake housing part (3) and the second brake housing part (7), and in that the first brake housing part (3) and the second brake housing part (7) are welded to one another in the connecting section (11).

18 Claims, 1 Drawing Sheet

(52) U.S. Cl.
CPC ..... *E05Y 2600/54* (2013.01); *E05Y 2800/268* (2013.01); *E05Y 2800/676* (2013.01); *E05Y 2900/531* (2013.01); *E05Y 2900/546* (2013.01)

(58) Field of Classification Search
CPC ......... E05Y 2800/676; E05Y 2900/531; E05Y 2900/546
See application file for complete search history.

(56) References Cited

U.S. PATENT DOCUMENTS

| | | | | |
|---|---|---|---|---|
| 6,918,167 | B2 * | 7/2005 | Hughes | E05D 5/0207 228/139 |
| 10,151,365 | B2 * | 12/2018 | Bach | F16D 65/562 |
| 10,280,674 | B2 * | 5/2019 | Leonard | E05F 1/1041 |
| 10,767,412 | B2 * | 9/2020 | Scheuring | E05F 15/622 |
| 10,889,182 | B1 * | 1/2021 | Lee | B60K 17/043 |
| 11,015,378 | B2 * | 5/2021 | Fees | E05F 1/1058 |
| 11,067,156 | B1 * | 7/2021 | Heiberger | F16H 25/2454 |
| 11,248,405 | B2 * | 2/2022 | Schmengler | F16D 65/125 |
| 11,643,858 | B2 * | 5/2023 | Rossi | E05C 17/24 16/82 |
| 11,697,959 | B2 * | 7/2023 | Fu | F16F 7/04 74/89.32 |
| 2006/0267373 | A1 * | 11/2006 | Maiwald | E05D 5/0207 296/146.1 |
| 2018/0226871 | A1 * | 8/2018 | Howack | H02K 15/00 |
| 2018/0313123 | A1 * | 11/2018 | Kenyon | E05D 11/087 |
| 2019/0169901 | A1 | 6/2019 | Yamagata et al. | |
| 2020/0308892 | A1 | 10/2020 | Kummer | |
| 2021/0054889 | A1 * | 2/2021 | Bals | E05F 15/622 |
| 2022/0235836 | A1 * | 7/2022 | Kaesgen | F16D 65/127 |
| 2023/0041203 | A1 * | 2/2023 | Dörnen | E05F 15/622 |

FOREIGN PATENT DOCUMENTS

| | | | |
|---|---|---|---|
| DE | 202018101761 | * | 4/2018 |
| DE | 202018101761 | U1 | 4/2018 |
| DE | 112017003930 | T5 | 4/2019 |
| DE | 102017128389 | A1 | 6/2019 |
| EP | 2196701 | A2 | 6/2010 |
| EP | 2669458 | A2 | 12/2013 |
| EP | 4006289 | A1 | 6/2022 |

* cited by examiner

BRAKING DEVICE FOR A DRIVE DEVICE

The present disclosure relates to a braking device for a drive device.

BACKGROUND

Drive devices, in particular for adjusting a vehicle panel, such as a vehicle door or a tailgate, are known from practice, wherein the drive device is connected, in an articulated manner, by a first end to the vehicle panel and by a second end to a vehicle body. The drive devices for adjusting a vehicle panel are usually designed as spindle drives and generally comprise a braking device for more precise adjustment of the vehicle panel, which braking device can provide a locking function and can also control or adjust the overrun behavior of the electric motor installed in such drive devices. In particular, such braking devices are intended to ensure that the vehicle panel stops in the current position as rapidly as possible when the electric motor is switched off. This is to advantageously prevent the vehicle panel from hitting an obstacle and being damaged in the process.

DE 10 2015 009 717 A1 discloses a braking device for a drive device, in particular for a drive device for adjusting a vehicle panel, comprising a brake housing, wherein the brake housing comprises a first brake housing part and a second brake housing part. Further, the braking device disclosed comprises a first brake element arranged non-rotatably in the brake housing, a second brake element arranged rotatably in the brake housing and a biasing means for biasing one of the first brake element and the second brake element toward the other of the first brake element and the second brake element in the direction of a longitudinal axis of the brake housing. The brake housing has a connecting portion for connecting the first brake housing part and the second brake housing part, wherein the first brake housing part and the second brake housing part are press-fitted to one another in the connecting portion. Disadvantageously the braking force is only adjusted inflexibly and as a function of the external shape of the brake housing parts, since the brake housing parts are connected by means of a force-fitting fastening produced by press-fitting.

DE 20 2018 101 761 U1 discloses a braking device for a spindle drive. The braking device comprises a brake housing, wherein the brake housing comprises a first brake housing part and a second brake housing part. Furthermore, the braking device disclosed comprises a first brake element non-rotatably connected to the brake housing and a second brake element arranged rotatably relative to the brake housing, wherein a biasing means designed as a compression spring is arranged in the brake housing and provides axial biasing of the first brake element on the second brake element. For adjusting the biasing force of the compression spring, the braking device comprises a stop part which can be screwed into the brake housing and on which the biasing means is supported by a first end, wherein a second end of the biasing means is supported on the first brake element. This creates a bias on the brake disk package formed by the brake elements, and therefore a corresponding braking force is provided to the component which can be coupled to the second brake element. A disadvantage of the braking device disclosed is that an additional stop part, which has to be screwed in, is required to set the biasing force or the braking force provided by the braking device. This requires additional installation space and in particular the residual technical length of the drive device is increased as a result. A further disadvantage is that the braking torque provided by the braking device can be influenced by the twisting of the stop part during assembly. In addition, the accuracy of adjusting the biasing force is determined by the accuracy of the internal or external threads provided for screwing, wherein in some cases such accuracy is too low due to manufacturing tolerances and does not meet the requirements for certain vehicle panels.

DE 11 2017 003 930 T5 discloses a drive device for adjusting a vehicle panel, comprising a housing, wherein the housing comprises a first housing part and a second housing part. Further, the drive device comprises a ball socket which is made of synthetic resin and is integrally connected to an end portion of the first housing part by means of laser welding.

SUMMARY

It is an object of the present disclosure to provide a braking device, in particular a braking device for a drive device for adjusting a vehicle panel, which allows a more precise adjustment of the braking force and is as compact as possible.

According to one aspect of the present disclosure, a braking device for a drive device, in particular for a drive device for adjusting a vehicle panel, is provided, comprising a brake housing, the brake housing comprising a first brake housing part and a second brake housing part. Further, the braking device comprises a first brake element arranged non-rotatably in the brake housing, a second brake element rotatably arranged in the brake housing and a biasing means for biasing one of the first brake element and the second brake element toward the other of the first brake element and the second brake element in a direction of a longitudinal axis of the brake housing. The braking device according to the present disclosure is characterized in that the brake housing has a connecting portion for connecting the first brake housing part and the second brake housing part, and in that the first brake housing part and the second brake housing part are welded together in the connecting portion. This advantageously ensures that the first brake housing part and the second brake housing part are particularly securely and firmly connected to one another, thereby creating the possibility of making the braking device compact and also of defining the braking force of the braking device more precisely, as will be explained in more detail below.

In a particularly preferred embodiment, the first brake housing part and the second brake housing part overlap axially in the connecting portion. Advantageously, the overall length of the brake housing can be variably adjusted when manufacturing the braking device by selecting or adjusting the axial overlap of the first brake housing part and the second brake housing part. If the overall length of the brake housing is equal to the desired value, the first brake housing part and the second brake housing part may be connected to one another by means of welding and therefore determine the overall length of the brake housing.

Preferably, one of the first brake housing part and the second brake housing part radially surrounds the other of the first brake housing part and the second brake housing part at least in the connecting portion of the brake housing. Advantageously, the first brake housing part and second brake housing part are arranged concentrically to one another. Advantageously, the entire brake housing is constructed concentrically about its longitudinal axis. In addition, this has the advantage that the welded connection between the first brake housing part and the second brake housing part can be made in the connecting portion along the entire circumferential surface of the other brake housing part, and therefore the connection is particularly stable.

In a preferred development, the first brake housing part and the second brake housing part are laser-welded to one another in the connecting portion of the brake housing. Welding by means of a laser advantageously provides a particularly stable connection between the first brake housing part and the second brake housing part that is also temperature resistant. In addition, the insertion of connecting material, as would be the case with bonding or soldering, is not necessary, and therefore a particularly simple type of connection is created.

Particularly preferably, the first brake housing part and the second brake housing part are made of plastic at least in the connecting portion of the brake housing. Particularly preferably, the first brake housing part and the second brake housing part are each made entirely of plastic. Advantageously, the brake housing or the brake housing part can be manufactured cost-effectively in large numbers by means of injection molding methods, wherein a high degree of accuracy and reproducibility is also achieved.

Advantageously, in a development, one of the first brake housing part and the second brake housing part is made of a laser-transparent plastic at least in the connecting portion of the brake housing. Advantageously, the other of the first brake housing part and the second brake housing part is made of a laser-intransparent plastic at least in the connecting portion of the brake housing. Advantageously, the first brake housing part can be connected to the second brake housing part particularly easily from the outside using a laser, without the brake housing or brake housing parts having to be additionally touched mechanically. For this purpose, the laser beam is guided through the brake housing part which is made of a laser-transparent plastic, and the brake housing part which is made of a laser-intransparent plastic is locally melted and thus a firmly bonded connection between the housing parts is produced by means of welding. Particularly advantageously, the connection can be produced very rapidly and efficiently and can also be automated. Here, “laser-transparent” means that the material is transparent to radiation with a wavelength of a laser; “laser-intransparent” here means that the material is not transparent to radiation with a wavelength of a laser.

Expediently, the first brake housing part has a first stop surface and the second brake housing part has a second stop surface, wherein the first stop surface faces the second stop surface. Particularly preferably, the first brake element, the second brake element and the biasing means are clamped axially between the first stop surface of the first brake housing part and the second stop surface of the second brake housing part. Advantageously, this makes it possible to adjust the biasing force and thus the braking force generated by the braking device by axial displacement of the first brake housing part relative to the second brake housing part and to fix it through the subsequent integral connection of the first brake housing part to the second brake housing part by means of welding.

In an expedient development, the first brake housing part is hollow cylindrical, with a radially circumferential annular step being formed on an inner circumference of the first brake housing part. For example, the annular step can have a circular shape or a polygonal shape, such as that of an octagon. Advantageously, the annular step has the first stop surface. Particularly preferably, one of the first brake element and the second brake element abuts against the annular step of the first brake housing part. In an advantageous development, the second brake housing part has an annular base. Advantageously, the annular base has the second stop surface facing the first stop surface. Advantageously, the stop surfaces may simply be produced cost-effectively and with high precision by an injection molding method during the manufacture of the brake housing parts. However, the adjustment of the biasing force and thus of the braking element provided by the braking device is advantageously performed by displacing the first brake housing part relative to the second brake housing part along a direction parallel to the longitudinal axis of the brake housing.

According to another aspect of the present disclosure, a drive device for adjusting a vehicle panel is provided that is characterized by a braking device as described above.

Further advantages, properties and developments of the present disclosure emerge from the following description of a preferred exemplary embodiment.

BRIEF SUMMARY OF THE DRAWINGS

The present disclosure is explained in more detail below with reference to the accompanying drawings using a preferred exemplary embodiment.

DETAILED DESCRIPTION

Figure 1:
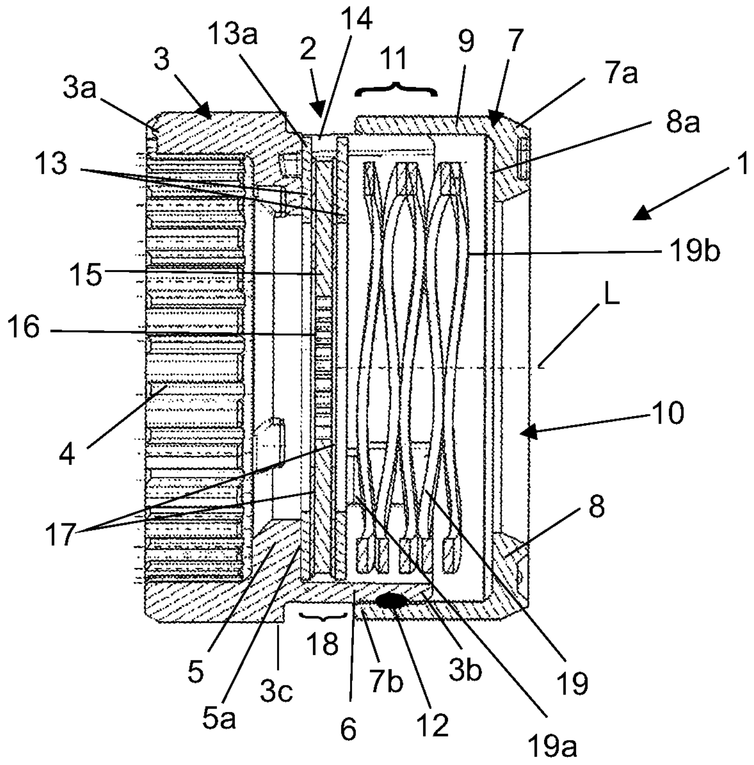
FIG. 1 shows a preferred exemplary embodiment of a braking device according to the present disclosure in a side view sectioned longitudinally.

FIG. 1 shows a preferred exemplary embodiment of a braking device 1 according to the present disclosure in a side view sectioned longitudinally. The braking device 1 comprises a brake housing 2, wherein the brake housing 2 comprises a first brake housing part 3. The first brake housing part 3 is substantially hollow cylindrical and comprises a first end 3*a*, which also forms a first end of the brake housing 2. In the region of the first end 3*a*, the first brake housing part 3 has an inner toothing 4 on its inner circumference.

The inner toothing 4 serves to connect the first brake housing part 3 to a bearing element (not shown here), in particular a ball bearing for rotatably supporting a spindle rod (not shown here) of a spindle drive. The first brake housing part 3 is made of a laser-intransparent plastic so that the bearing element can be pressed into the first end 3*a* of the first brake housing part 3 via the inner toothing 4 with an external toothing, as a result of which the bearing element can be fastened in the first end 3*a* of the first brake housing part 3 in a rotationally fixed and axially secured manner.

Opposite the first end 3*a*, the first brake housing part 3 has a second end 3*b*. Between the first end 3*a* and the second end 3*b*, the first brake housing part 3 further has a middle portion 3*c*. In the middle portion 3*c*, the first brake housing part 3 has a radially circumferential annular step 5 on its inner circumference, the function of which will be explained below. In the region of the second end 3*b*, the first brake housing part 3 has a hollow cylinder wall 6 which extends axially along the longitudinal axis L of the brake housing 2 up to the annular step 5.

The brake housing 2 further comprises a second brake housing part 7. The second brake housing part 7 has a first end 7*a*, wherein the first end 7*a* forms a second end of the brake housing 2 opposite the first end 3*a*. The second brake housing part 7 has an annular base 8 at the first end 7*a*. Opposite the first end 7*a*, the second brake housing part 7 has a second end 7*b*. In the region of the second end 7*b*, the second brake housing part 7 has a hollow cylinder wall 9 which extends to the annular base 8. The second brake housing part 7 is advantageously pot-shaped, wherein a circular opening 10 which is delimited by the annular base 8 is provided on the base side.

The hollow cylinder wall 6 of the first brake housing part 3 and the hollow cylinder wall 9 of the second brake housing part 7 overlap axially in a connecting portion 11. The first brake housing part 3 is thereby connected to the second brake housing part 7 via the connecting portion 11. For this purpose, the hollow cylinder wall 6 of the first brake housing part 3 has an outer diameter that is smaller than an inner diameter of the hollow cylinder wall 9 of the second brake housing part 7 so that the second end 3*b* of the first brake housing part 3 can be inserted into the second end 7*b* of the second brake housing part 7 to form the connecting portion 10.

In the connecting portion 11, the hollow cylinder wall 6 of the first brake housing part 3 is integrally connected to the hollow cylinder wall 9 of the second brake housing part 7 by a first weld point 12, which is shown schematically. In the exemplary embodiment shown here, the hollow cylinder wall 9 of the second brake housing part 7 is made of a laser-transparent plastic and the hollow cylinder wall 6 of the first brake housing part 3 is made of a laser-intransparent plastic. The first brake housing part 3 is thus connected to the second brake housing part 7 by means of laser welding. Advantageously, the overall length of the brake housing 2 can be selected very precisely by telescopically displacing the first brake housing part 3 relative to the second brake housing part 7 and then welding it from the outside through the hollow cylinder wall 9 of the second brake housing part 7 using a laser.

Two first brake elements 13 are arranged in the brake housing 2, wherein the first brake elements 13 are designed as annular brake disks and are non-rotatably connected to the brake housing 2. For this purpose, the first brake elements 13 have projections 13*a* projecting radially outward, wherein one projection 13*a* passes through a slot-shaped opening 14 in the hollow cylinder wall 6 provided on the inner circumference of the first brake housing part 3. As a result, the first brake element 13 is connected to the first brake housing part 3 in a non-rotatably but axially displaceable manner.

Further, a second brake element 15 is arranged in the brake housing 2, wherein the second brake element 15 is rotatable relative to the brake housing 2. The second brake element 15 is designed as an annular brake disk, wherein it has a central internal toothing 16 that can be brought into engagement with a corresponding external toothing of a spindle rod (not shown here) so that the second brake element 15 can be non-rotatably connected to the spindle rod. When the spindle rod rotates, the second brake element 15 rotates accordingly with it. The second brake element 15 has an outer diameter that is smaller than the inner diameter of the hollow cylinder wall 6 of the first brake housing part 3 so that the second brake element 15 is freely rotatable within the first brake housing part 3 and radially surrounded by the hollow cylinder wall 6 of the first brake housing part 3.

The second brake element 15 is arranged axially between the two first brake elements 13. An annular intermediate element 17, which is made of a carbon fabric, is arranged between each one of the first brake elements 13 and the second brake elements 15. The first brake elements 13, the second brake element 15 and the annular intermediate elements 17 together form a brake disk package 18. To define a predetermined braking force, the braking device 1 comprises a biasing means 19, which in the exemplary embodiment shown here is designed as a wave spring, wherein the biasing means 19 is provided to bias the brake disk package 18.

For this purpose, the biasing means 19 abuts with a first end 19*a* against the first brake element 13, which brake element faces the annular base 8 of the second brake housing part 7. Further, the biasing means 19 abuts with a second end 19*b* opposite the first end 19*a* against the annular base 8 or a stop surface 8*a* of the second brake housing part 7. Furthermore, the brake disk package 18 or the first brake element 13, which is arranged facing away from the annular base 8 of the second brake housing part 7, abuts against a stop surface 5*a* of the annular step 5 of the first brake housing part 3.

The brake disk package 18 and the biasing means 19 are advantageously arranged axially between the first stop surface 5*a* of the annular step 5 of the first brake housing part 3 and the second stop surface 8*a* of the annular base of the second brake housing part 7. Advantageously, the biasing force exerted on the brake disk package 18 can thus be adjusted by axially displacing the first brake housing part 3 relative to the second brake housing part 7 and can be fixed by subsequently connecting the first brake housing part 3 and the second brake housing part 7 in the connecting portion 11, since the brake disk package 18 and the biasing means 19 are arranged together between the annular step 5 of the first brake housing part 3 and the annular base 8 of the second brake housing part 7.

Figure 2:
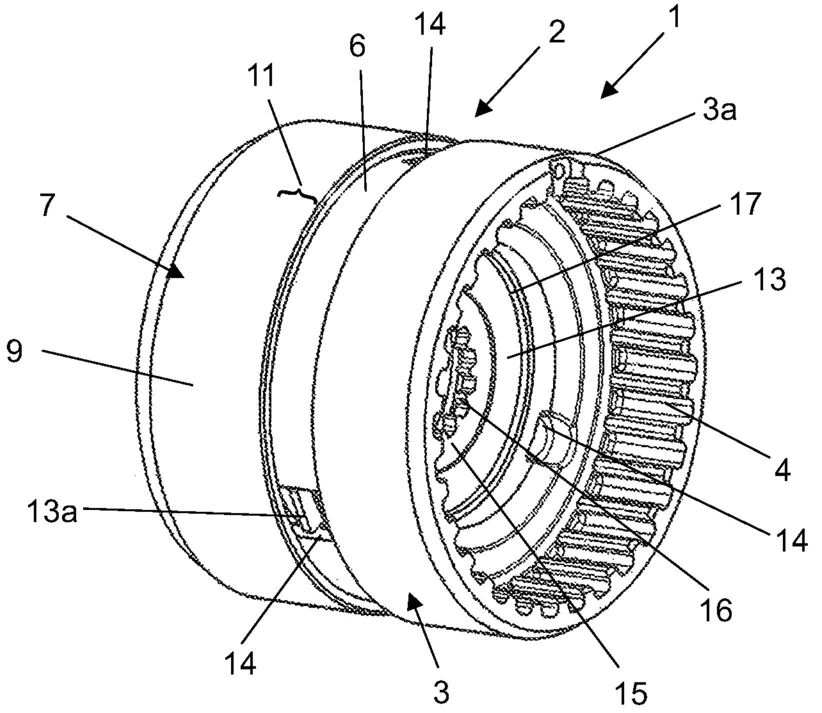
FIG. 2 shows the braking device from FIG. 1 in a perspective view.

FIG. 2 shows the braking device 1 of FIG. 1 in a perspective view. In this view, it can be clearly seen that the first brake housing part 3 has an inner toothing 4 arranged along the inner circumference at its first end 3*a*, which inner toothing is designed for pressing in a bearing element. Furthermore, it can be clearly seen that the hollow cylinder wall 6 of the first brake housing part 3 has a total of three slot-shaped openings 14, through which the radial projections 13*a* of the first brake elements 13 pass. Furthermore, the second brake element 15 clamped between the first brake elements 13 can be seen, wherein the second brake element 15 has an inner toothing 16 for a non-rotatable connection with a spindle rod. Finally, one of the intermediate elements 17, which is clamped between a first braking element 13 and the second braking element 15, can be seen.

The second brake housing part 7 can also be seen, which is fitted like a cover onto the hollow cylinder wall 6 of the first brake housing part 3 and thus forms the brake housing 2 together with the first brake housing part 3, wherein the first brake housing part 3 and the second brake housing part 7 are integrally connected to one another by means of laser welding in the connecting portion 11, in which the hollow cylinder wall 6 of the first brake housing part 3 and the hollow cylinder wall 9 of the second brake housing part 7 overlap axially.

The present disclosure was explained above on the basis of an exemplary embodiment, in which the first brake housing part 3 is made of a laser-intransparent plastic and the second brake housing part 7 is made of a laser-transparent plastic. This is the case or advantageous in the exemplary embodiment shown because the hollow cylinder wall 9 of the second brake housing part 7 is arranged on the outside in the connecting portion, making laser welding easier. However, it is understood that the first brake housing part 3 can also be made of a laser-transparent plastic and the second brake housing part 7 can be made of a laser-intransparent plastic.

What is claimed is:

1. A braking device for a drive device for adjusting a vehicle panel, comprising:

a brake housing comprising a first brake housing part (3) and a second brake housing part, said first housing part and second housing part defining a longitudinal axis, wherein the first brake housing part has a first end forming a first end of the brake housing, a second end opposite the first end and a middle portion between the first end and the second end, wherein the first brake housing part has a radially circumferential annular step (5) on an inner circumference thereof in the middle portion and wherein the first brake housing has an inner toothing on an inner circumference thereof in an region of the first end, wherein the inner toothing is configured to connect the first brake housing part to a bearing element;

a first brake element non-rotatably arranged in the brake housing;

a second brake element rotatably arranged in the brake housing; and a biasing means for biasing one of the first brake element and the second brake element toward the other of the first brake element and the second brake element in a direction of the longitudinal axis of the brake housing, wherein the brake housing comprises a connecting portion for connecting the first brake housing part and the second brake housing part, and wherein the first brake housing part and the second brake housing part are laser-welded to one another in the connecting portion of the brake housing.

2. The braking device according to claim 1, wherein the first brake housing part and the second brake housing part axially overlap in the connecting portion.

3. The braking device according to claim 1, wherein one of the first brake housing part and the second brake housing part radially surrounds the other of the first brake housing part and the second brake housing part at least in the connecting portion of the brake housing.

4. The braking device according to claim 1, wherein the first brake housing part and the second brake housing part are arranged concentrically to one another.

5. The braking device according to claim 1, wherein an entirety of the brake housing is constructed concentrically about its longitudinal axis.

6. The braking device according to claim 1, wherein the first brake housing part and the second brake housing part are each made of plastic at least in the connecting portion of the brake housing.

7. The braking device according to claim 1, wherein the first brake housing part and the second brake housing part are each made entirely of plastic.

8. The braking device according to claim 1, wherein one of the first brake housing part and the second brake housing part is made of a laser-transparent plastic at least in the connecting portion of the brake housing.

9. The braking device according to claim 8, wherein the other of the first brake housing part and the second brake housing part is made of a laser-intransparent plastic at least in the connecting portion of the brake housing.

10. The braking device according to claim 1, wherein the first brake housing part has a first stop surface and the second brake housing part has a second stop surface.

11. The braking device according to claim 10, wherein the first stop surface faces the second stop surface.

12. The braking device according to claim 11, wherein the first brake element, the second brake element and the biasing means are axially clamped between the first stop surface and the second stop surface.

13. The braking device according to claim 1, wherein the first brake housing part is hollow cylindrical.

14. The braking device according to claim 10, wherein the annular step has the first stop surface.

15. The braking device according to claim 1, wherein one of the first brake element and the second brake element abuts against the annular step of the first brake housing part.

16. The braking device according to claim 10, wherein the second brake housing part has an annular base.

17. The braking device according to claim 16, wherein the annular base has the second stop surface facing the first stop surface.

18. A drive device for adjusting a vehicle panel comprising:

the braking device according claim 1.

* * * * *